United States Patent
Seto

(10) Patent No.: US 8,355,173 B2
(45) Date of Patent: *Jan. 15, 2013

(54) COLOR PROCESSING APPARATUS AND CONTROL METHOD THEREOF

(75) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,567

(22) Filed: Jan. 4, 2012

(65) Prior Publication Data

US 2012/0113446 A1    May 10, 2012

Related U.S. Application Data

(63) Continuation of application No. 12/323,469, filed on Nov. 25, 2008, now Pat. No. 8,111,424.

(30) Foreign Application Priority Data

Dec. 28, 2007    (JP) ................................. 2007-341119

(51) Int. Cl.
*H04N 1/60*    (2006.01)

(52) U.S. Cl. ......... 358/1.9; 358/504; 358/3.23; 358/520

(58) Field of Classification Search .................. 358/1.9, 358/2.1, 3.23, 504, 515, 518, 520, 534; 382/162, 382/167; 399/49

See application file for complete search history.

(56) References Cited

U.S. PATENT DOCUMENTS

| | | | |
|---|---|---|---|
| 6,738,168 B1* | 5/2004 | Usui et al. ..................... | 358/520 |
| 6,804,025 B1* | 10/2004 | Ueda et al. ..................... | 358/1.9 |
| 7,064,860 B1* | 6/2006 | Balasubramanian et al. . | 358/1.9 |
| 8,064,690 B2* | 11/2011 | Suzuki .......................... | 382/162 |
| 8,111,424 B2* | 2/2012 | Seto ............................... | 358/1.9 |
| 2004/0090640 A1* | 5/2004 | Nino et al. ..................... | 358/1.9 |
| 2005/0083346 A1* | 4/2005 | Takahashi et al. ............. | 382/167 |
| 2005/0238374 A1* | 10/2005 | Yoshida ......................... | 399/49 |
| 2007/0030505 A1* | 2/2007 | Ito et al. ........................ | 358/1.9 |
| 2007/0279657 A1* | 12/2007 | Kishimoto et al. ............ | 358/1.9 |
| 2007/0291312 A1* | 12/2007 | Kaneko et al. ................ | 358/2.1 |
| 2008/0208500 A1* | 8/2008 | Mestha et al. ................ | 356/402 |
| 2008/0294363 A1* | 11/2008 | Parmar et al. ................. | 399/301 |
| 2009/0185231 A1* | 7/2009 | Hoshii et al. .................. | 358/3.23 |
| 2009/0185232 A1* | 7/2009 | Hoshii et al. .................. | 358/3.23 |
| 2009/0213392 A1* | 8/2009 | Hoshii et al. .................. | 358/1.9 |
| 2009/0213434 A1* | 8/2009 | Ito et al. ........................ | 358/3.23 |
| 2010/0177357 A1* | 7/2010 | Yoshida ......................... | 358/3.21 |
| 2011/0267629 A1* | 11/2011 | Fan et al. ...................... | 358/1.9 |

FOREIGN PATENT DOCUMENTS

| JP | 2004-230826 A | 8/2004 |
|---|---|---|
| JP | 2007-324862 A | 12/2007 |

* cited by examiner

*Primary Examiner* — Kimberly A Williams
(74) *Attorney, Agent, or Firm* — Canon USA Inc IP Division

(57) ABSTRACT

The number of color patches is reduced to attain high-precision color estimation. Hence, the colorimetric values of a plurality of color patches of at least one primary color output by an output device are input. Based on the colorimetric value of first color patches corresponding to a part of the plurality of color patches, colorimetric values corresponding to second color patches other than the first color patches of the plurality of color patches are estimated. Errors between the input colorimetric values of the second color patches and the estimated colorimetric values corresponding to the second color patches are calculated. A plurality of color patches corresponding to the output device is determined based on the calculated errors.

4 Claims, 11 Drawing Sheets

FIG. 2

| R | G | B | C | M | Y | K | Lc | Lm | Gy | R | G | B | Lgy |
|---|---|---|---|---|---|---|----|----|----|---|---|---|-----|
| 0 | 0 | 0 | 0 | 0 | 0 | 255 | 0 | 0 | 0 | 0 | 0 | 0 | 0 |
| 0 | 0 | 32 | 30 | 45 | 0 | 150 | 0 | 0 | 50 | 0 | 0 | 32 | 10 |
| 0 | 0 | 64 | 50 | 70 | 0 | 30 | 0 | 0 | 80 | 0 | 0 | 64 | 30 |
| 0 | 0 | 96 | 70 | 80 | 0 | 5 | 0 | 0 | 70 | 0 | 0 | 96 | 40 |
| 0 | 0 | 128 | 70 | 90 | 0 | 0 | 0 | 0 | 30 | 0 | 0 | 128 | 50 |
| 0 | 0 | 160 | 70 | 80 | 0 | 0 | 0 | 0 | 0 | 0 | 0 | 160 | 40 |
| 0 | 0 | 192 | 50 | 70 | 0 | 0 | 0 | 0 | 0 | 0 | 0 | 192 | 30 |
| 0 | 0 | 224 | 30 | 45 | 0 | 0 | 0 | 0 | 0 | 0 | 0 | 224 | 10 |
| 0 | 32 | 255 | 0 | 0 | 0 | 0 | 0 | 0 | 0 | 0 | 10 | 255 | 0 |
| 0 | ... | ... | 20 | 0 | 0 | 150 | 5 | 0 | 130 | 0 | 0 | 0 | 0 |
| ... | ... | ... | ... | ... | ... | ... | ... | ... | ... | ... | ... | ... | ... |
| ... | ... | ... | ... | ... | ... | ... | ... | ... | ... | ... | ... | ... | ... |
| ... | ... | ... | ... | ... | 10 | ... | ... | ... | ... | ... | ... | ... | ... |
| 255 | 255 | 224 | 0 | 0 | 0 | 0 | 0 | 0 | 0 | 0 | 0 | 0 | 0 |
| 255 | 255 | 255 | 0 | 0 | 0 | 0 | 0 | 0 | 0 | 0 | 0 | 0 | 0 |

FIG. 8

| PRINTER MODEL NUMBER | NUMBER OF COLOR MATERIALS | TYPE OF COLOR MATERIAL | | | | | | | | | | |
|---|---|---|---|---|---|---|---|---|---|---|---|---|
| | | C | M | Y | K | Lc | Lm | Gy | R | G | B | Lgy |
| 01 | 6 | 0 | 0 | 1 | 1 | 1 | 1 | 1 | 0 | 0 | 0 | 1 |
| 02 | 6 | 1 | 0 | 1 | 0 | 1 | 1 | 0 | 0 | 1 | 1 | 0 |
| 03 | 5 | 0 | 1 | 0 | 0 | 1 | 1 | 0 | 1 | 0 | 1 | 0 |
| 04 | 1 | 0 | 0 | 1 | 0 | 0 | 0 | 0 | 0 | 0 | 0 | 0 |
| 05 | 6 | 1 | 0 | 0 | 1 | 0 | 0 | 1 | 0 | 1 | 1 | 1 |
| 06 | 6 | 0 | 1 | 1 | 1 | 0 | 0 | 1 | 1 | 0 | 0 | 1 |
| 07 | 8 | 0 | 0 | 1 | 1 | 1 | 1 | 1 | 1 | 0 | 0 | 1 |
| 08 | 7 | 0 | 1 | 1 | 1 | 0 | 1 | 1 | 0 | 1 | 0 | 1 |
| 09 | 6 | 1 | 0 | 0 | 0 | 0 | 0 | 0 | 1 | 0 | 0 | 1 |
| 10 | 6 | 1 | 1 | 1 | 0 | 1 | 1 | 0 | 0 | 1 | 0 | 1 |
| 11 | 3 | 0 | 0 | 0 | 0 | 1 | 0 | 0 | 0 | 0 | 1 | 0 |
| 12 | 4 | 1 | 0 | 1 | 0 | 1 | 1 | 0 | 0 | 0 | 0 | 0 |
| 13 | 4 | 1 | 0 | 0 | 0 | 1 | 1 | 0 | 0 | 0 | 1 | 0 |
| 14 | 5 | 1 | 1 | 1 | 0 | 0 | 1 | 0 | 0 | 0 | 1 | 0 |
| 15 | 4 | 0 | 1 | 1 | 1 | 0 | 1 | 0 | 1 | 0 | 0 | 0 |

FIG. 9

| ID | C | M | Y | K | Lc | Lm | Gy | R | G | B | Lgy | PRESENCE/ABSENCE OF SPECTRAL REFLECTANCE DATA |
|---|---|---|---|---|---|---|---|---|---|---|---|---|
| 1 | 0 | 0 | 0 | 0 | 0 | 0 | 0 | 0 | 0 | 0 | 0 | 1 |
| 2 | 85 | 0 | 0 | 0 | 0 | 0 | 0 | 0 | 0 | 0 | 0 | 1 |
| 3 | 170 | 0 | 0 | 0 | 0 | 0 | 0 | 0 | 0 | 0 | 0 | 1 |
| 4 | 255 | 0 | 0 | 0 | 0 | 0 | 0 | 0 | 0 | 0 | 0 | 1 |
| 5 | 0 | 85 | 0 | 0 | 0 | 0 | 0 | 0 | 0 | 0 | 0 | 1 |
| 6 | 85 | 85 | 0 | 0 | 0 | 0 | 0 | 0 | 0 | 0 | 0 | 1 |
| 7 | 170 | 85 | 0 | 0 | 0 | 0 | 0 | 0 | 0 | 0 | 0 | 1 |
| 8 | 255 | 85 | 0 | 0 | 0 | 0 | 0 | 0 | 0 | 0 | 0 | 1 |
| 9 | 0 | 0 | 85 | 0 | 0 | 0 | 0 | 0 | 0 | 0 | 0 | 1 |
| 10 | 85 | 0 | 85 | 0 | 0 | 0 | 0 | 0 | 0 | 0 | 0 | 1 |
| ... | ... | ... | ... | ... | ... | ... | ... | ... | ... | ... | ... | ... |
| 4,194,303 | 170 | 255 | 255 | 255 | 255 | 255 | 255 | 255 | 255 | 255 | 255 | 0 |
| 4,194,304 | 255 | 255 | 255 | 255 | 255 | 255 | 255 | 255 | 255 | 255 | 255 | 0 |

F I G. 10

SPECTRAL REFLECTANCE

| ID | 400 | 410 | 420 | 430 | 440 | 450 | ... | 690 | 700 [nm] |
|---|---|---|---|---|---|---|---|---|---|
| 1 | 0.01 | 0.01 | 0.02 | 0.02 | 0.03 | 0.04 | ... | 0.01 | 0.05 |
| 3 | 0.01 | 0.01 | 0.01 | 0.01 | 0.01 | 0.01 | ... | 0.12 | 0.11 |
| 20 | 0.02 | 0.05 | 0.12 | 0.14 | 0.13 | 0.14 | ... | 0.15 | 0.11 |
| 24 | 0.02 | 0.08 | 0.20 | 0.22 | 0.24 | 0.19 | ... | 0.15 | 0.13 |
| 18 | 0.01 | 0.01 | 0.02 | 0.02 | 0.03 | 0.04 | ... | 0.21 | 0.20 |
| 6 | 0.02 | 0.01 | 0.02 | 0.02 | 0.03 | 0.04 | ... | 0.09 | 0.10 |
| 4 | 0.02 | 0.10 | 0.14 | 0.15 | 0.17 | 0.18 | ... | 0.20 | 0.11 |
| 8 | 0.03 | 0.02 | 0.01 | 0.02 | 0.02 | 0.03 | ... | 0.30 | 0.20 |
| 9 | 0.04 | 0.05 | 0.06 | 0.13 | 0.15 | 0.15 | ... | 0.30 | 0.20 |
| 10 | 0.10 | 0.21 | 0.32 | 0.27 | 0.29 | 0.24 | ... | 0.24 | 0.10 |
| . | . | . | . | . | . | . | ... | . | . |
| 1,000,105 | 0.02 | 0.01 | 0.02 | 0.04 | 0.03 | 0.04 | ... | 0.20 | 0.11 |
| 9,800 | 0.01 | 0.01 | 0.02 | 0.02 | 0.03 | 0.03 | ... | 0.23 | 0.24 |

COLOR PROCESSING APPARATUS AND CONTROL METHOD THEREOF

CROSS-REFERENCE TO RELATED APPLICATIONS

This application is a continuation of U.S. patent application Ser. No. 12/323,469 filed Nov. 25, 2008, which claims the benefit of Japanese Patent Application No. 2007-341119, filed Dec. 28, 2007, all of which are hereby incorporated by reference herein in their entirety.

BACKGROUND OF THE INVENTION

1. Field of the Invention

The present invention relates to color processing for estimating an output color of a printing device.

2. Description of the Related Art

As an estimation method of a color to be reproduced by a printer, a Cellular Yule-Nielsen Neugebauer model is known. With this model, color patches corresponding to grid points set in advance are printed by the printer, and a color (output color) to be reproduced by the printer with respect to an arbitrary input value is estimated according to the Neugebauer model based on color information obtained by measuring the color patches. However, because a limitation of the total amount of applied color materials such as inks is often exceeded, the color patches of not all grid points set in advance can be printed. Hence, in Y. Chen, R. S. Berns and L. A. Taplin, "Six Color Printer Characterization Using an Optimized Cellular Yule-Nielsen Spectral Neugebauer Model", J. Imaging Sci. Tech. Vol. 48, No. 6, pp. 519-528 (2004), color information of grid points which cannot be printed is estimated by multiple regression from that of the printed and measured color patches.

With the estimation method of the above reference, the number of color patches to be printed and measured becomes huge if the number of color materials increases. In order to improve color estimation precision, the number of grid points needs to be increased. However, it is not practical to print and measure a huge number of color patches. For this reason, grid points which are not printed and measured become constraints, and sufficiently high precision cannot be obtained.

Also, print sheets of different types used in printing have different limitations as to the total amount of applied color materials. Hence, the number of color patches to be printed varies depending on the types of print sheets, thus readily introducing confusion upon printing and measurement of the color patches.

The aforementioned problems pose a serious bottleneck along with the current progress of multi-color printers.

SUMMARY OF THE INVENTION

The present invention is directed to a color processing apparatus and a method of controlling the color processing apparatus.

In one aspect, a color processing apparatus for determining color patches corresponding to an output device includes an input section configured to input colorimetric values of a plurality of color patches of at least one primary color output by the output device; an estimator configured to estimate, based on the colorimetric values of first color patches corresponding to a part of the plurality of color patches, colorimetric values corresponding to second color patches other than the first color patches of the plurality of color patches; a calculator configured to calculate errors between the colorimetric values of the second color patches input by the input section and the colorimetric values corresponding to the second color patches estimated by the estimator; and a determiner configured to determine a plurality of color patches corresponding to the output device based on the errors calculated by the calculator.

According to another aspect of the present invention, a method of controlling a color processing apparatus includes inputting colorimetric values of a plurality of color patches of at least one primary color output by an output device; estimating, based on the colorimetric values of first color patches corresponding to a part of the plurality of color patches, colorimetric values corresponding to second color patches other than the first color patches of the plurality of color patches; calculating errors between the colorimetric values of the second color patches input in the inputting step, and the colorimetric values corresponding to the second color patches estimated in the estimating step; and determining a plurality of color patches corresponding to the output device based on the errors calculated in the calculating step.

According to the aspects, the number of color patches can be reduced, and high-precision color estimation can be implemented.

Further features of the present invention will become apparent from the following description of exemplary embodiments with reference to the attached drawings.

BRIEF DESCRIPTION OF THE DRAWINGS

FIG. 2 is a view showing an example of a lookup table to be referred to when a color separation unit separates R, G, and B image signals into color-separated signals;

FIG. 8 is a table showing the numbers and types of color materials of respective printer models when the color estimation unit has 15 types of printer models;

FIG. 9 is a view showing an example of a table indicating grid point information;

FIG. 10 is a view showing an example of data held by a primary spectral reflectance holding unit;

DESCRIPTION OF THE EMBODIMENTS

Color processing of embodiments according to the present invention will be described in detail hereinafter with reference to the accompanying drawings.

First Embodiment

A color processing apparatus which prepares a color conversion table (color separation table) for an ink-jet printing device which uses color materials of 11 colors will be explained below as an embodiment.

[Printer]

Figure 1:
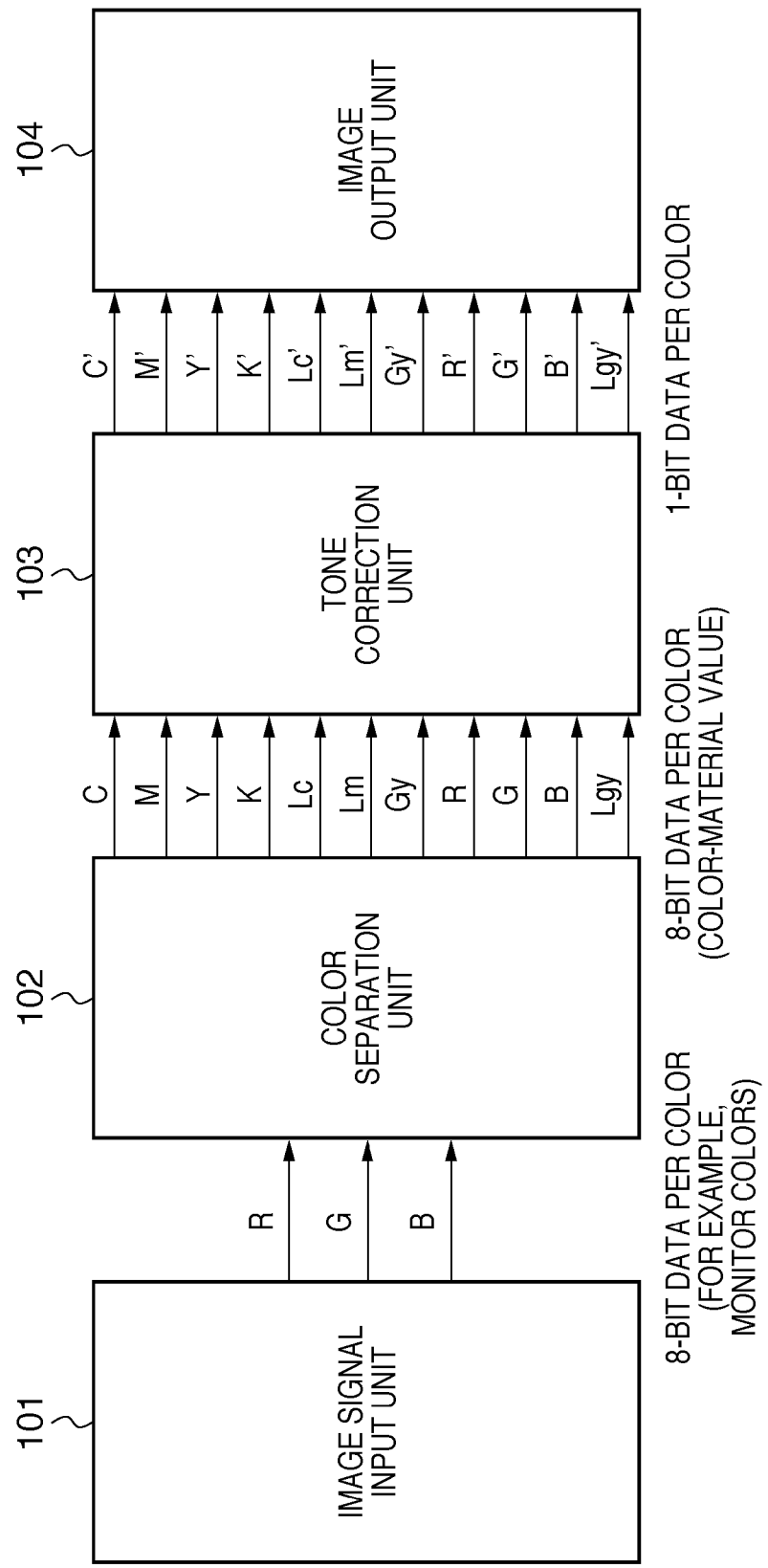
FIG. 1 is a block diagram for explaining print processing of a printer.

FIG. 1 is a block diagram for explaining print processing of a printer. This printer uses the following color materials in addition to cyan C, magenta M, yellow Y, and black K as dark color materials. That is, the printer uses light cyan Lc, light magenta Lm, and gray Gy as light color materials, red R, green G, and blue B as color materials corresponding to complementary colors of C, M, and Y, and light gray Lgy as a further light color material of Gy.

An image signal input unit 101 inputs image signals from a host device (not shown). The image signals are, for example, color image signals of 8 bits per color for three channels R, G, and B, which are defined by sRGB as a standard color space or a color space such as AdobeRGB or the like.

A color separation unit 102 separates the color image signals input by the image signal input unit 101 into image signals of 8 bits per color for 11 channels C, M, Y, K, Lc, Lm, Gy, R, G, B, and Lgy (to be referred to as color-separated signals hereinafter) corresponding to the color materials of the printer.

FIG. 2 shows an example of a lookup table (to be referred to as a color separation table hereinafter) to be referred to when the color separation unit 102 separates the R, G, and B image signals into color-separated signals.

The color separation table records output values of C, M, Y, K, Lc, Lm, Gy, R, G, B, and Lgy for all combinations ($9^3$=729 colors) obtained by sampling the R, G, and B channels in, for example, nine steps (0, 32, 64, 96, 128, 160, 192, 224, 255). The color separation unit 102 converts input values (R, G, and B values) into output values (color-material values) corresponding to the color-separated signals corresponding to these input values using an interpolation operation such as tetrahedron interpolation, linear interpolation, or the like, with reference to the color separation table.

A tone correction unit 103 converts the color-separated signals into print signals of 1 bit per color for 11 channels. The tone correction unit 103 applies, for example, a 16×16 Bayer matrix to each of the color-separated signals of 11 channels, and outputs '1' when the pixel value of each color-separated signal is larger than a matrix element or '0' when the pixel value is equal to or smaller than a matrix element. Error diffusion or the like may be used as a pseudo halftoning method.

An image output unit 104 prints an image on a print sheet fed in the sub-scan direction by scanning a print head (not shown) in the main scan direction and controlling discharge of color materials of respective color nozzles of the print head in accordance with the print signals of 11 channels. Note that a print signal '1' corresponds to discharge of a color material, and a print signal '0' corresponds to non-discharge of a color material.

The color-material values of the color separation table are required to be determined so as to satisfactorily reproduce colors expressed by the input color image signals on a print sheet.

[Preparation Apparatus of Color Separation Table]

Figure 3:
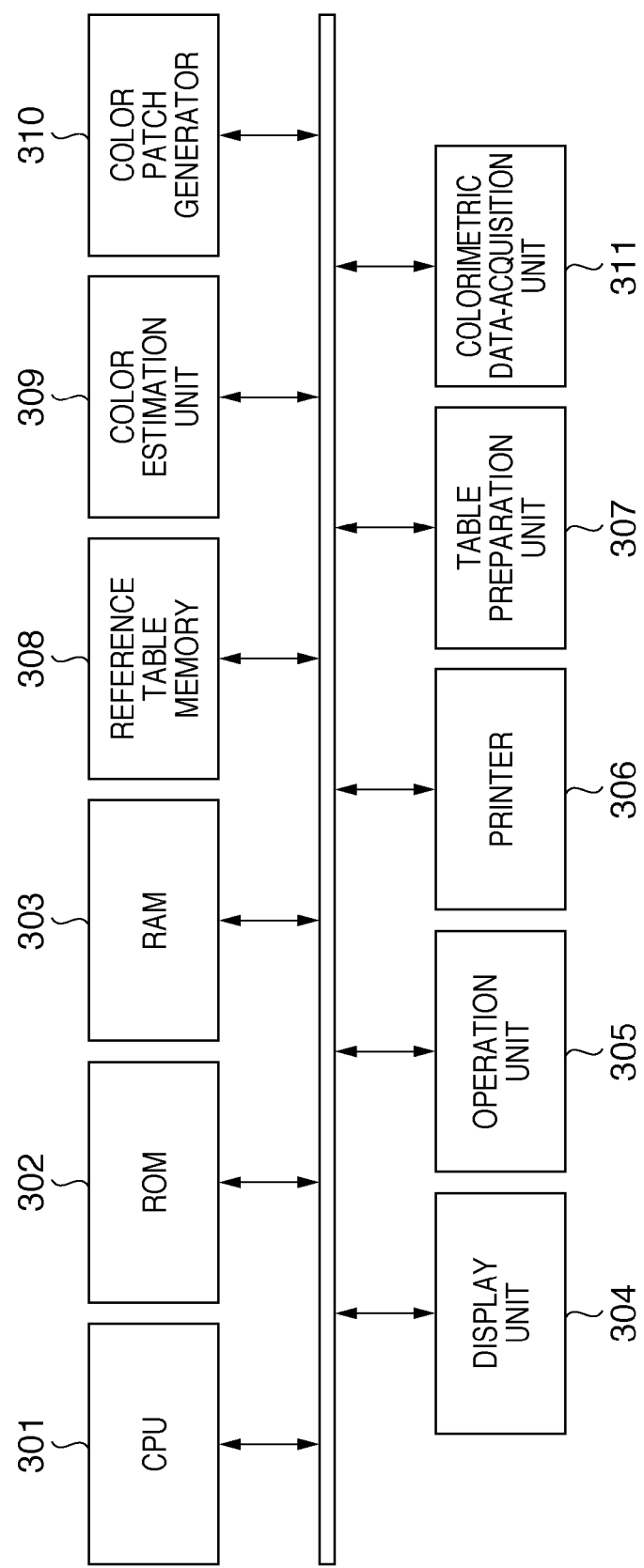
FIG. 3 is a block diagram showing the arrangement of a preparation apparatus of a color separation table.

FIG. 3 is a block diagram showing the arrangement of a preparation apparatus of the color separation table.

A microprocessor (CPU) 301 controls the overall apparatus by executing programs stored in a read-only memory (ROM) 302 using a random access memory (RAM) 303 as a work memory.

The CPU 301 displays a user interface (UI) on a display unit 304 such as a liquid crystal panel or the like. The CPU 301 displays the processing result, instructions to the user, error messages, and the like on the UI. The user inputs operations (user's instructions) to the UI from an operation unit 305 including a keyboard, pointing device, and the like.

A printer 306 uses the aforementioned color materials of 11 colors, and prints color patches generated by a color patch generator 310 under the control of the CPU 301. Note that the color separation table prepared by the color separation table preparation apparatus is usable in the printer 306 after it is downloaded to the printer 306.

A reference table memory 308 holds a plurality of color separation tables for typical print sheets in advance. The color separation table preparation apparatus prepares color separation tables for various types of print sheets or required print qualities with reference to the color separation tables held in the reference table memory 308.

A colorimetric data-acquisition unit 311 acquires the measurement results (spectral reflectance data) of color patches which are generated by the color patch generator 310 and are printed by the printer 306 from a colorimeter, and outputs the measurement results to a color estimation unit 309 under the control of the CPU 301.

The color estimation unit 309 estimates CIELab values corresponding to color-material values required by a table preparation unit 307 based on the color information (spectral reflectance data) corresponding to the color-material values of the color patches, as will be described in detail later. The details of the processes of the color estimation unit 309, table preparation unit 307, and color patch generator 310 will be described later.

Table Preparation Unit

Figure 4:
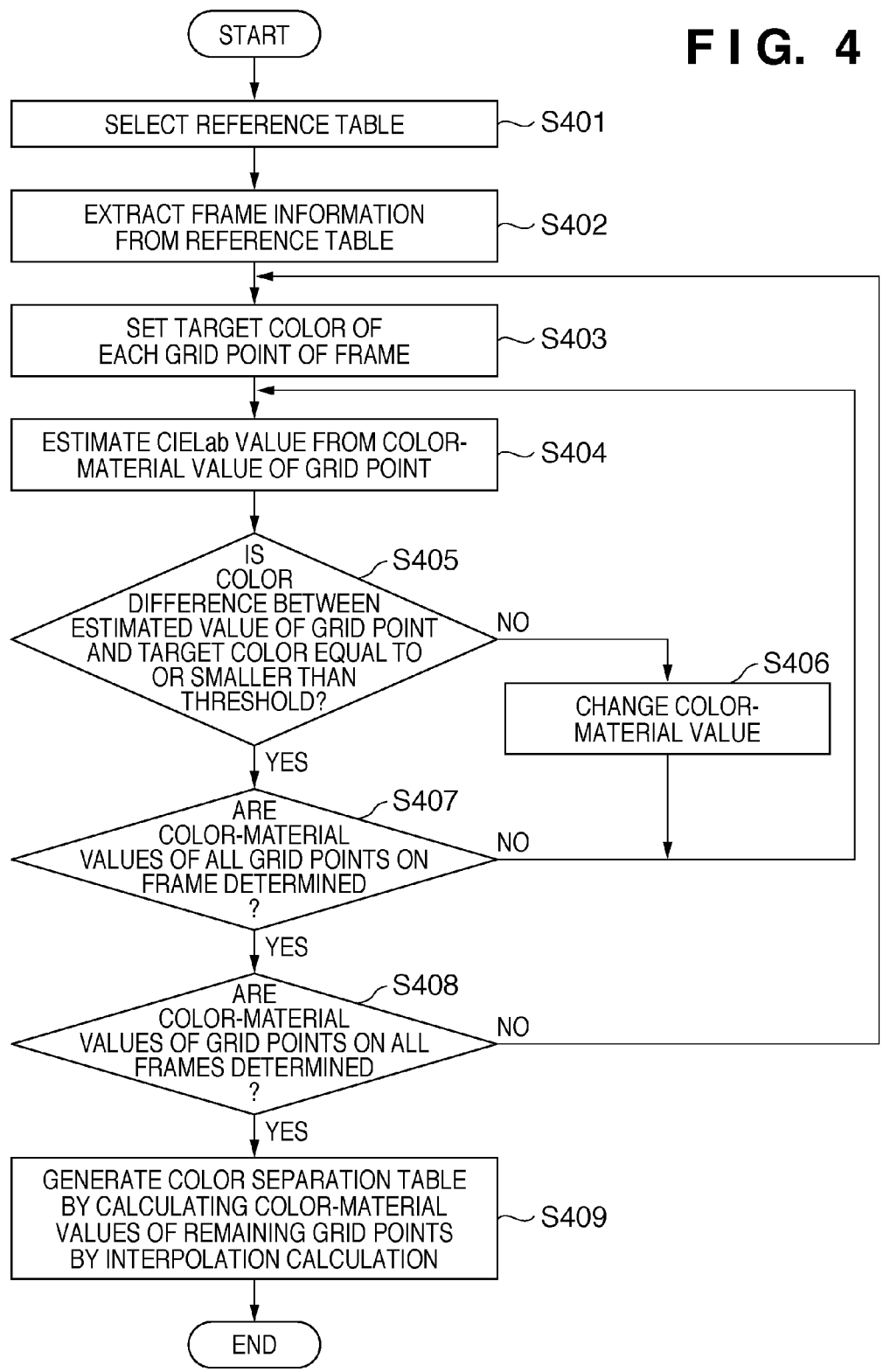
FIG. 4 is a flowchart for explaining processing of a table preparation unit.

FIG. 4 is a flowchart for explaining the processing of the table preparation unit 307, and this processing is executed according to an instruction from the CPU 301.

The table preparation unit 307 selects a color separation table having print conditions closest to the quality (type) of a print sheet and print quality of a color separation table to be prepared as a reference table from a plurality of color separation tables held in the reference table memory 308 (S401). The quality (type) of a print sheet and print quality will often be referred to as print conditions hereinafter. For example, assume that the reference table memory 308 holds color separation tables of typical print sheets for respective types of print sheets such as glossy paper, mat paper, coat paper, plain paper, and the like.

When the table preparation unit 307 prepares a color separation table for a print sheet which belongs to glossy paper and for high print quality, it selects a color separation table for typical glossy paper and high print quality. Note that the reference table may be selected according to a user's instruction via the operation unit 305 or by determining the type of print sheets supplied to the printer 306 using a measurement unit.

The table preparation unit 307 then extracts frame information from the selected reference table (S402).

Figure 5:
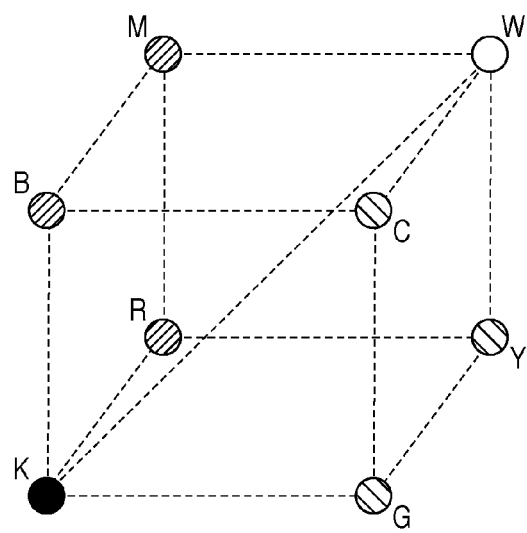
FIG. 5 is a view showing grids of a lookup table (LUT)

FIG. 5 is a view showing grids of a lookup table (LUT). When input values of the LUT are R, G, and B 8-bit values, a W point of vertical grid points corresponds to (R, G, B)=(255, 255, 255). Likewise, a K point=(0, 0, 0), R point=(255, 0, 0), G point=(0, 255, 0), B point=(0, 0, 255), C point=(0, 255, 255), M point=(255, 0, 255), and Y point=(255, 255, 0). Nineteen line segments WC, WM, WY, WR, WG, WB, KC, KM, KY, KR, KG, KB, YR, YG, CG, CB, MB, MR, and WK which couple these eight vertical grid points to each other will be referred to as frames hereinafter. The table preparation unit 307 extracts the correspondence (frame information) between R, G, and B values located on a frame and the color-material values of 11 colors from the reference table.

Figure 6:
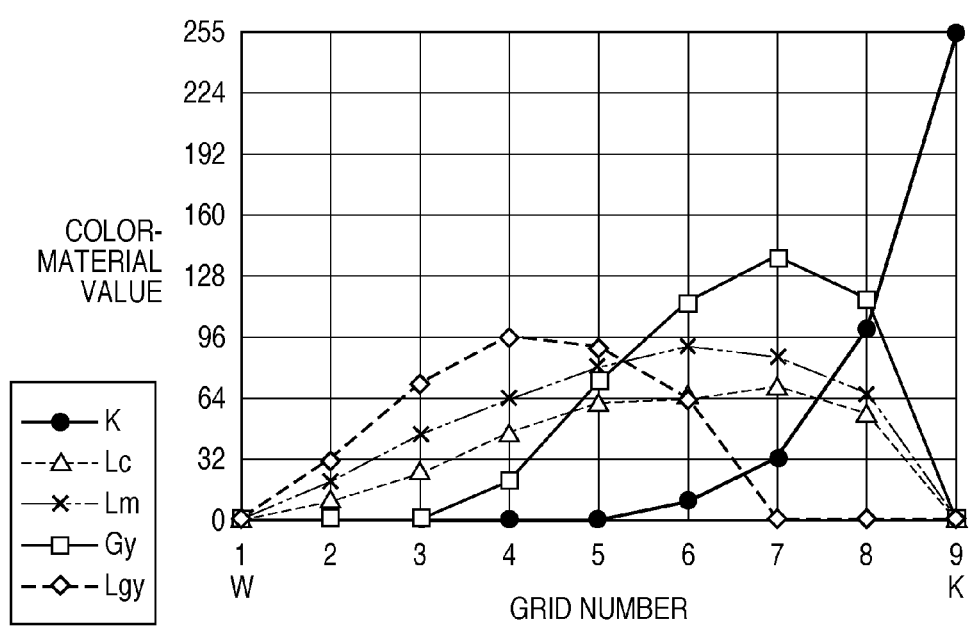
FIG. 6 is a view showing an example of color-material values of respective color materials on a frame WK (gray line)

FIG. 6 shows an example of the color-material values of the color materials on the frame WK (gray line). Grid numbers on the abscissa are obtained by numbering grid points through which the frame WK passes in turn from the W point. When the color separation table has nine steps, nine grid points are located on the frame WK. Grid number 1 corresponds to the W point of (R, G, B)=(255, 255, 255); grid number 2, a grid point of (224, 224, 224); grid number 3, a grid point of (192, 192, 192), . . . ; and grid number 9, the K point of (0, 0, 0). That is, the table preparation unit 307 extracts the correspondence between the R, G, and B values and color-material values from grid numbers 1 to 9 from the reference table.

The table preparation unit 307 determines the color-material values of the color materials in correspondence with the grid points on the 19 frames, and then determines those of the color materials of grid points other than the frames by interpolation processing, thus generating a color separation table.

The table preparation unit 307 sets target colors (CIELab values) of grid points on a certain frame (S403). As a target color, a value determined in advance for each frame and grid point is recorded in the ROM 302 or the like. The user may input a target color by operating the operation unit 305.

The table preparation unit 307 controls the color estimation unit 309 to estimate a CIELab value based on the color-material value of grid point acquired from the reference table (S404), and checks color difference between the estimated value and target value of the grid point (S405). If the color difference does not meet a predetermined condition (equal to or smaller than a threshold), the table preparation unit 307 changes the color-material value (S406), and controls the color estimation unit 309 to estimate a CIELab value corresponding to the changed color-material value (S404). The table preparation unit 307 repeats steps S404 to S406 until color differences, which correspond to the grid points on the frame, meet the predetermined condition.

Updating of the color-material values in step S406 is attained by increasing/decreasing the color-material values according to a predetermined algorithm. In this case, the number of color materials having significant color-material values is not increased. For example, when color materials used on the frame WK are Lc, Lm, Gy, Lgy, and K, the color-material values of these five colors are changed, and other color materials are never added. In other words, the color-material values other than Lc, Lm, Gy, Lgy, and K are kept set to be zero. In this way, by limiting the number of color materials depending on frames, even for the printer having color materials as many as 11 colors, color estimation (S404) can be implemented relatively quickly. Also, the limitation of the total amount of applied color materials can be secured.

Note that the condition (threshold) for checking color differences may assume different values for respective frames. The checking condition is not limited to color differences. For example, checking conditions according to frame characteristics may be set (e.g., hue differences may be used as a checking condition for a certain frame, lightness differences may be used as that for another frame, and so forth).

The table preparation unit 307 checks if the color-material values of all the grid points on the frame are determined (S407), checks if the color-material values of all grid points on all the frames (S408), and repeats steps S403 to S406 until the color-material values of all the grid points on all the frames are determined.

After the color-material values of all the grid points on all the frames are determined, the table preparation unit 307 calculates the color-material values of remaining grid points (those which are not located on the frames) by an interpolation operation using the color-material values of the grid points of the respective frames, thus generating a color separation table (S409).

In this manner, colors to be reproduced are estimated from the color-material values of the frames acquired from the reference table, and the color-material values of the respective frames are updated based on the estimation results. In this way, color separation tables that can implement identical color reproduction on various print sheets having different color developing characteristics can be prepared. Since the reproduced colors are estimated by limiting the total amount of applied color-material values for each frame, color estimation can be done quickly.

Color Estimation Unit

Figure 7:
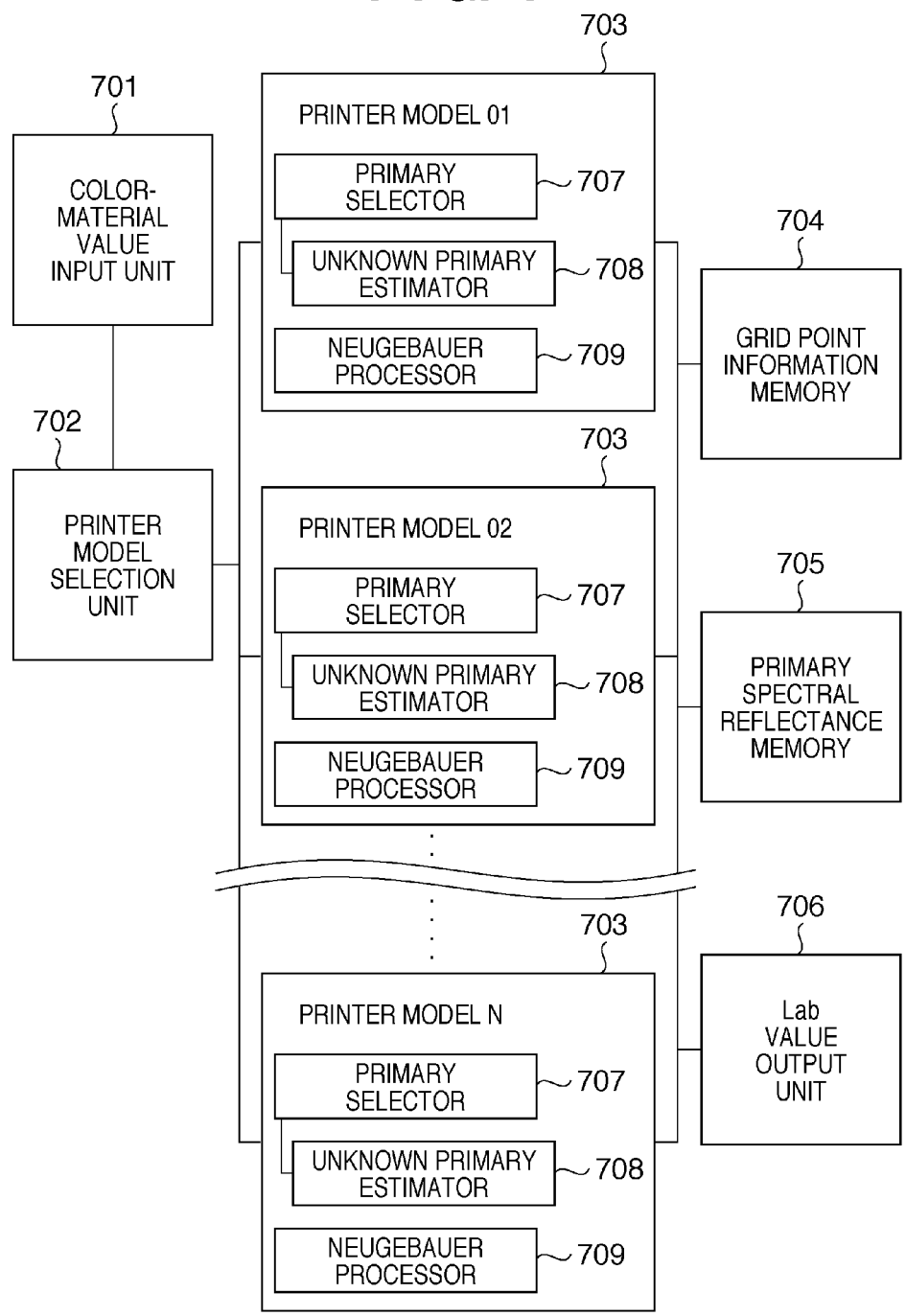
FIG. 7 is a block diagram showing the arrangement of a color estimation unit.

FIG. 7 is a block diagram showing the arrangement of the color estimation unit 309.

A color-material value input unit 701 inputs color-material values of 11 colors. A printer model selection unit 702 selects a printer model 703 optimal to color estimation based on the color-material values input by the color-material value input unit 701, and inputs the color-material values to the selected printer model 703. The printer model 703 estimates spectral reflectances which are to be reproduced by the printer 306 in correspondence with the color-material values.

The color estimation unit 309 has a plurality of printer models 703 having different numbers and types of color materials (FIG. 7 shows an example in which the color estimation unit 309 has N printer models 703). Each printer model 703 has a primary selector 707, unknown primary estimator 708, and Neugebauer processor 709, which execute processes required for color estimation.

FIG. 8 is a table showing the numbers and types of color materials of respective printer models 703 when the color estimation unit 309 has 15 types of printer models 703. The type '0' of a color material means that the corresponding color material is not used, and '1' means that the corresponding color material is used. As shown in FIG. 8, even the printer having the color materials of 11 colors does not simultaneously use the color materials of 11 colors, and color estimation can be done by combining the plurality of printer models 703 each having a smaller number of color materials. By combining the printer models 703 each having a smaller number of color materials, the operation amount required for color estimation is reduced, thus speeding up the processing.

A grid point information memory 704 holds grid point information. FIG. 9 shows an example of a table indicating grid point information. This table records the following information in correspondence with grid point numbers (IDs). One information includes color-material values obtained by sampling those of each color material at given intervals, and the other information includes a flag indicating whether or not a primary spectral reflectance memory 705 holds spectral reflectance data which is obtained by outputting the corresponding color-material value to the printer 306 and measuring it by the colorimeter.

FIG. 9 shows an example obtained by sampling all the color materials in four steps of color-material values=0, 85, 170, and 255, and combinations of $4^{11}$=4,194,304 color-material values, and corresponding flags are recorded as the grid point information. A flag '0' means that the primary spectral reflectance memory 705 does not hold spectral reflectance data corresponding to the combination of the color-material values, and '1' means that the primary spectral reflectance memory 705 holds the data.

The primary spectral reflectance memory 705 holds spectral reflectance data of color patches acquired by the colorimetric data-acquisition unit 311 or those estimated by the unknown primary estimator 708. FIG. 10 shows an example of data held by the primary spectral reflectance memory 705. The primary spectral reflectance memory 705 holds a table that records spectral reflectance data corresponding to the grid point numbers (IDs). Note that FIG. 10 shows an example in which reflectance data for wavelengths of 400 to 700 nm are held in 10-nm steps. However, the present invention is not limited to this.

The grid point information memory 704 and primary spectral reflectance memory 705 are shared by the plurality of printer models 703. With this sharing, spectral reflectance data estimated by the unknown primary estimator 708 of, for example, printer model 01 need not be redundantly estimated by the unknown primary estimator 708 of another printer model 703 such as printer model 19 or the like. Then, the spectral reflectance data estimated by the unknown primary estimator 708 of, for example, printer model 01 can be used by the Neugebauer processor 709 of another printer model 703. In particular, the processing of the unknown primary estimator 708 requires a large operation amount, and sharing the estimation results of spectral reflectance data can greatly improve the processing efficiency.

An Lab value output unit 706 converts the spectral reflectance data estimated by each printer model 703 into CIELab values and outputs the converted values.

Figure 11:
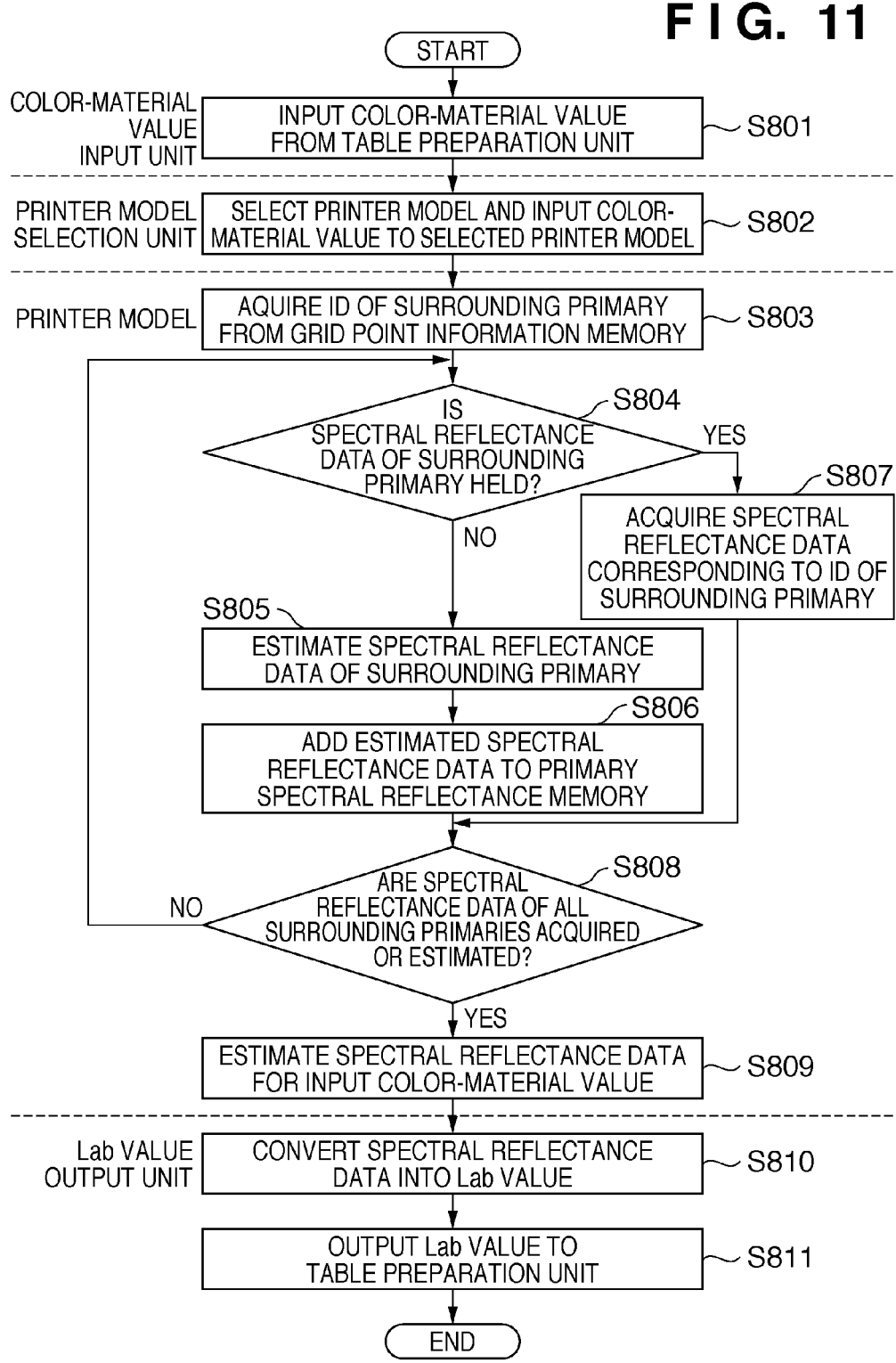
FIG. 11 is a flowchart for explaining processing of the color estimation unit.

FIG. 11 is a flowchart for explaining the processing of the color estimation unit 309, and this processing is executed according to an instruction from the CPU 301.

The color-material value input unit 701 inputs a color-material value from the table preparation unit 307 (S801). The printer model selection unit 702 selects a printer model 703, and inputs the color-material value to the selected printer model 703 (S802). The printer model selection unit 702 selects a printer model with the smallest number of color materials from those having all color materials which are significant (nonzero) for the input color-material value. However, selection of the print remodel 703 is not limited to this. For example, frame information may be input to the color estimation unit 309, and a printer model 703 associated with the frame information in advance may be selected.

The printer model 703 acquires the IDs of surrounding primaries from the grid point information memory 704 using the primary selector 707 (S803). More specifically, the printer model 703 acquires the IDs of all grid points that surround the input color-material value. The grid points that surround the input color-material value are grid points A and B which meet a color-material value of grid point A<an input color-material value<a color-material value of grid point B in a significant color material (the type of nonzero color material shown in FIG. 8) in the selected printer model 703. If there is a plurality of significant color materials, the color-material values of grid points A and B are calculated for each of the significant color materials. That is, letting M be the number of significant color materials, there are $2^M$ surrounding primaries.

The printer model 703 checks with reference to the flags in the grid point information memory 704 shown in FIG. 9 whether or not the primary spectral reflectance memory 705 holds spectral reflectance data of the acquired surrounding primaries (S804). If spectral reflectance data are held, the printer model 703 acquires the spectral reflectance data corresponding to the IDs of the surrounding primaries from the primary spectral reflectance memory 705 (S807).

If spectral reflectance data are not held, the printer model 703 estimates spectral reflectance data using the unknown primary estimator 708 (S805). The spectral reflectance data is estimated by multiple-regressing given spectral reflectance data by:

$$\vec{Rj} = \vec{Fj} \cdot Pj \qquad (1)$$

where $\vec{Rj}$ is a spectral reflectance vector of unknown surrounding primaries to be estimated, $\vec{Fj}$ is a coating ratio vector of the unknown surrounding primaries, and Pj is an estimation matrix.

The coating ratio vector $\vec{Fj}$ is calculated by converting an input color-material value vector into a ratio (coating ratio) at which $2^M$ primaries coat the print sheet surface. Note that the primaries in this case are all combinations of cases when the coating ratio of each color material assumes two states of 0% (a color-material value=0) and 100% (a color-material value=255). Therefore, the number of primaries is $2^M$. Note that the coating ratio depends on the tone correction unit 103 of the printer 306 and a dot gain generated when a dot of a color material is formed on a print sheet, and the color-material value is converted into the coating ratio with reference to a linear LUT which is set in advance for each color material, print sheet, and print mode.

The estimation matrix Pj can be calculated by:

$$Pj = (Fp^T wj^T wj Fp)^{-1} Fp^T wj^T wj Rp \qquad (2)$$

where wj is a weight matrix,

Fp is a coating ratio matrix of given primaries,

Rp is a spectral reflectance matrix of the given primaries, and

T is a transposed matrix.

The coating ratio matrix Fp of the given primaries is obtained by converting a color-material value vector corresponding to spectral reflectance data held in the primary spectral reflectance memory 705 into a coating ratio vector. Therefore, the coating ratio matrix Fp of the given primary has a size of (the number of primaries held in the primary spectral reflectance memory 705)$\times 2^M$.

The spectral reflectance matrix Rp used in the equation (2) (hereinafter, it is called an estimation matrix) includes data obtained by raising, to the (1/n)-th power, spectral reflectance data which are held in the primary spectral reflectance memory 705, and correspond to the coating ratio vector $\vec{Fj}$ of unknown surrounding primaries. n is called a Yule-Neilsen value, and a predetermined value is stored in the ROM 302 or the like. The estimation matrix Rp has a size of (the number of primaries held in the primary spectral reflectance memory 705)×(the number of dimensions of spectral reflectance data). Note that the number of dimensions of spectral reflectance data is 31 (dimensions) when 400 to 700 nm are sampled in 10-nm steps.

The weight matrix wj is a $2^M \times 2^M$ diagonal matrix. By setting the reciprocal numbers of Euclidean distances between the coating ratio vector $\vec{Fj}$ and respective rows of the coating ratio matrix Fp in diagonal elements of the weight matrix wj, the weights of given primaries having closer distances to the coating ratio vector $\vec{Fj}$ can be increased. In other words, by adjusting the weights, the estimation precision can be improved.

Finally, the estimation matrix Rp is multiplied by the Yule-Neilsen value n, thus ending estimation of spectral reflectance data of unknown primaries.

The sizes of the matrices included in equations (1) and (2) exponentially increase with increasing number of color materials since the number of primaries is $2^M$. On the other hand, the operation amount of an inverse matrix is generally proportional to the matrix size cubed, and it is expected that the operation amount in case of the color materials of 11 colors becomes $(2^{11}/2^4)^3=2,097,152$ times of that of color materials of four colors. In this embodiment, since the reproduction colors of the printer using 11 colors are estimated by combining printer models 703 having smaller numbers of color materials, the operation amount can be reduced, and the spectral reflectance data of unknown primaries can be estimated quickly.

The printer model 703 adds the estimated spectral reflectance data of the surrounding primaries to the primary spectral reflectance memory 705, and updates the flags indicating the presence/absence of spectral reflectance data in the grid point information memory 704 (S806). By updating the data in the primary spectral reflectance memory 705 and grid point information memory 704 shared by the plurality of printer models 703 in this way, the spectral reflectance data of identical unknown primaries are never redundantly estimated, thus improving the processing efficiency.

The printer model 703 then checks if the spectral reflectance data of all the surrounding primaries are acquired or estimated (S808), and repeats the processes in steps S804 to S807 until the spectral reflectance data of all the surrounding primaries are acquired or estimated.

After the spectral reflectance data of all the surrounding primaries are obtained, the printer model 703 raises the spectral reflectance data of the surrounding primaries to the (1/n)-th power using the Neugebauer processor 709. Then, the printer model 703 linearly interpolates the values raised to the (1/n)-th power based on the coating ratios of the surrounding primaries and input color material vector, and then raises the interpolated value to the n-th power, thereby estimating spectral reflectance data for the input color-material value (S809).

Next, the Lab value output unit 706 converts the spectral reflectance data supplied from the printer model 703 into Lab values (S810), and returns the Lab values to the table preparation unit 307 (S811).

Color Patch Generator

The precision of color estimation by the color estimation unit 309 becomes higher with increasing number of color patches to be measured. However, when the number of color materials becomes large, the number of color patches is huge, and the loads on printing and measurement of color patches become heavier. For example, when color-material values are sampled in four steps, there are 4,194,304 grid points in the printer of 11 colors. Even when grid points, which cannot be printed beyond the limitation of the total amount of applied color materials (e.g., due to overflow of inks), are excluded, th loads on printing and measurement are considerably heavy.

Furthermore, since the limitation of the total amount of applied color materials varies depending on the characteristics of print sheets, parameters of the tone correction unit 103, and the like, the number of color patches to be printed and measured is not uniquely determined, and confusion may be introduced into printing and measurement of color patches. In consideration of these problems, and also the processing of the table preparation unit 307 that optimizes frame color separation, a highest possible precision needs to be maintained, and the number of color patches to be printed needs to be suppressed.

Figure 12:
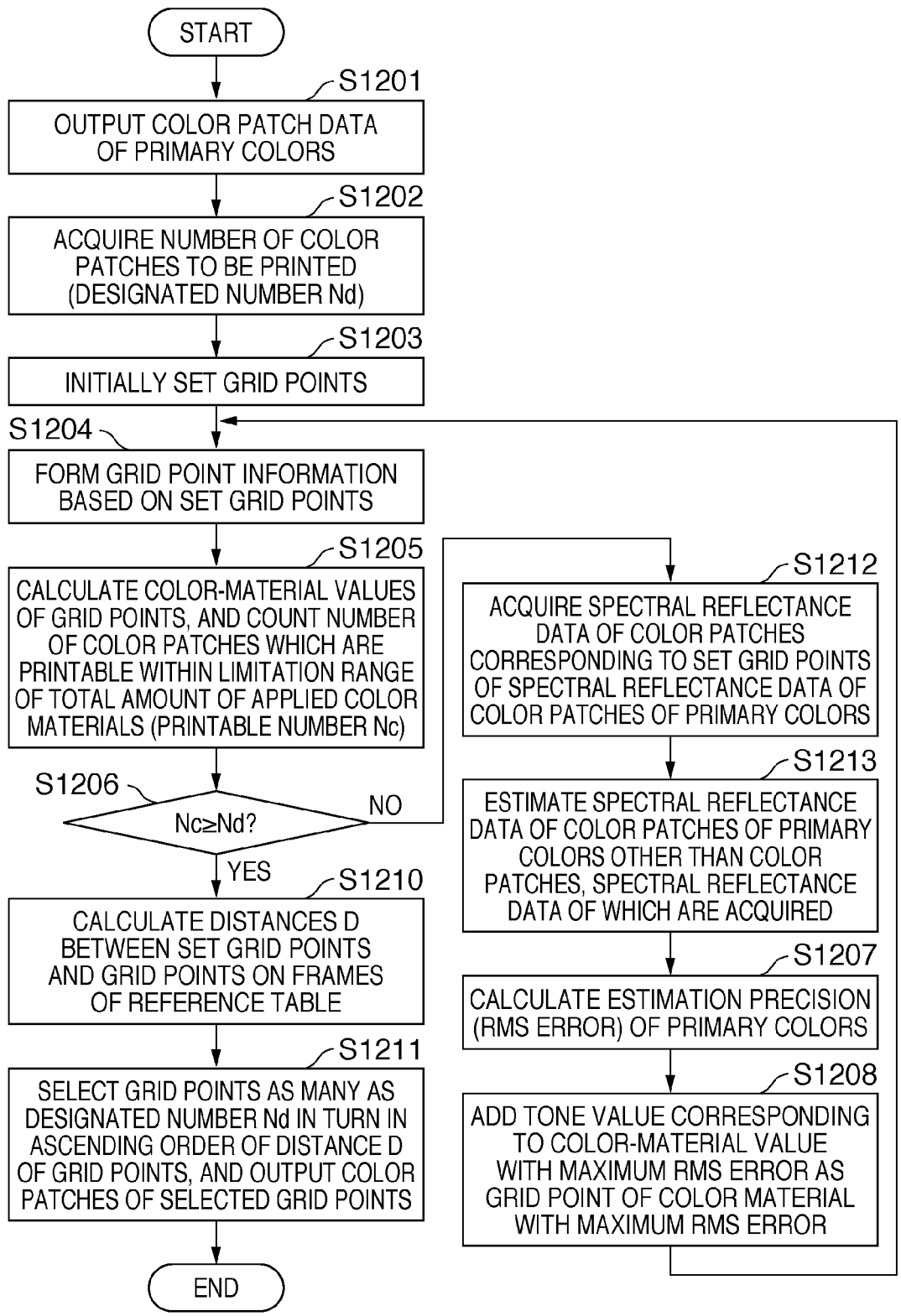
FIG. 12 is a flowchart for explaining processing of a color patch generator.

FIG. 12 is a flowchart for explaining the processing of the color patch generator 310, and this processing is executed according to an instruction from the CPU 301.

The color patch generator 310 outputs color patch data of primary colors (colors of color materials themselves free from any mixed colors) before it outputs color patches of multi-order colors, and controls the printer 306 to output the color patches on a print sheet (S1201). Upon printing the color patches, the printer 306 sets the color separation unit 102 shown in FIG. 1 to pass through data. In the following description, outputting of color patch data by the color patch generator 310 and printing of the color patches by the printer 306 will be expressed together as "to output color patch data".

The color patches of the primary colors correspond to 16 tones of color-material values=0, 16, 32, 64, 80, 96, 112, 128, 144, 160, 176, 192, 208, 224, 240, and 255 for respective color materials of the printer 306. That is, color patches of a total of 172 colors (=11 (the number of color materials)×16 (tones)) are output.

The colorimeter measures the spectral reflectances of the output color patches. The spectral reflectance data of the color patches are stored in the RAM 303 or the like via the colorimeter and colorimetric data-acquisition unit 311.

After the spectral reflectance data of the color patches of the primary colors are input, the color patch generator 310 acquires the number of color patches to be printed (designated number Nd) (S1202). The designated number Nd may be set according to a user's instruction via the operation unit 305 or data stored in advance in the ROM 302.

The color patch generator 310 initially sets grid points (S1203). Initial values of the grid points are three tones "0", "α", and "255" for respective color-material values. The color-material value α is a maximum color-material value that falls within the limitation range of the total amount of applied color materials when all color materials are printed on a print sheet to have equal color-material values. By initially setting the grid points of three tones including the color-material values α, spectral reflectance data can be acquired in association with all grid points defined by combinations of color-material values 0 and α. As a result, an inverse matrix operation in the processing (S805) of the unknown primary estimator 708 is executable.

The color patch generator 310 forms grid point information shown in FIG. 9 based on the initially set grid points (S1204). In the initial stage, since the grid points for three tones are set for respective color materials, the color patch generator 310 forms grid point information for $3^{11}=177,147$ points. Of course, at this time, the color patch generator 310 sets '0' in the flags indicating the presence/absence of spectral reflectance data.

The color patch generator 310 calculates the color-material values of the respective grid points, and counts the number of color patches which are printable within the limitation range of the total amount of applied color materials (printable number Nc) (S1205). The color-material value is given as, for example, a sum total of color-material values of respective color materials at each grid point. That is, the color patch generator 310 counts, as the printable number Nc, the number of grid points (corresponding to color patches) at each of which the calculated sum total of the color-material values is equal to or smaller than a threshold (corresponding to the limitation value of the total amount of applied color materials) prepared in advance for a print sheet and parameters of the tone correction unit 103.

The color patch generator 310 compares the printable number Nc and designated number Nd (S1206). If Nc≧Nd, the process advances to step S1210.

If Nc<Nd, the color patch generator 310 acquires spectral reflectance data of the color patches corresponding to the initially set grid points of those of the color patches of the primary colors (S1212). Then, the color patch generator 310 estimates spectral reflectance data of the color patches of the primary colors other than those, the spectral reflectance data of which are acquired (S1213). In this way, the reproduction colors of the primary colors can be estimated, and the color patch generator 310 calculates estimation precision (estimation errors) of the reproduction colors of the primary colors (S1207). More specifically, the color patch generator 310 calculates, as estimation errors, root mean square (RMS) errors from the spectral reflectance data estimated from the grid points to have the spectral reflectance data of the color patches of the primary colors as reference data. For example, assume that the spectral reflectance data of the primary colors of respective color materials are acquired in correspondence with the above 16 tones, and the initially set grid points are defined by 0, $\alpha$=80, and 255. In this case, spectral reflectance data of other grid points (color patches except for those of color-material values "0", "80", and "255") are estimated from those of the color patches of the color-material values "0", "80", and "255". Then, RMS errors between the colorimetric values and estimated values of the spectral reflectance data of other grid points are calculated. Note that this estimation is implemented as follows. That is, the color-material values are converted into coating ratios, and the spectral reflectance data are raised to the (1/n)-th power. Then, the values raised to the (1/n)-th power undergo linear interpolation on a coating ratio space, and are then raised to the n-th power.

The color patch generator 310 detects a color material and color-material value corresponding to the maximum RMS error, and adds a tone value corresponding to that color-material value as a grid point of that color material (S1208). The process then returns to step S1204. For example, when a color-material value "192" of a C color material exhibits a maximum RMS error, a tone value "192" is added to the grid points of the C color material to increase the grid points of the C color material to 0, 80 (=$\alpha$), 192, and 255.

After the grid point is added (S1208), the color patch generator 310 forms grid point information again (S1204). For example, when the grid points of the C color material are changed from three tones to four tones, the color patch generator 310 forms grid point information for $4 \times 3^{10}$=236,196 points.

The color patch generator 310 repeats the processes from step S1204 to step S1208 (setting of grid points) until the printable number Nc becomes equal to or larger than the designated number Nd.

If the printable number Nc becomes equal to or larger than the designated number Nd, the color patch generator 310 calculates distances D between the set grid points and those on the frames of the reference table (S1210). More specifically, the color patch generator 310 calculates Euclidean distances between color-material value vectors of the set grid point and those of the grid points located on the frames of the reference table, and selects the minimum Euclidean distances as the distances D of corresponding grid points.

The color patch generator 310 selects grid points as many as the designated number Nc in turn in ascending order of distance D of grid points, generates color patch data of the selected grid points, and outputs the color patch data (S1211).

As described above, the table preparation unit 307 determines the priority order upon outputting color patches based on the Euclidean distances D between the color patches (grid points) and those on the frames of the reference table. Therefore, many measurement results of colors close to those of grid points on the frames of the reference table are input to the color estimation unit 309. As a result, the number of color patches to be printed and measured can be suppressed while minimizing deterioration of the color estimation precision.

Note that the distances to be calculated between the color patches (grid points) and those on the frames of the reference table are not limited to Euclidean distances between the color-material value vectors. For example, respective color materials may be appropriately weighted to output more color patches including color materials having characteristics of lowering the color estimation precision, thereby improving the color estimation precision.

In this manner, the priority order upon outputting color patches is determined based on the distances between the color-material values of the grid points corresponding to the color patches and those of the grid points located on the frames of the reference table, and the color patches as many as the designated number Nd are output according to the priority order. Therefore, the number of color patches can be reduced, and high-precision color estimation can be implemented.

When the printable number Nc<the designated number Nd, grid points are added under the condition that the color estimation precision of the primary colors are lowest. Therefore, the estimation precision can be effectively improved by a smaller number of grid points (number of color patches). Furthermore, the grid points are added so as to set the printable number Nc to be larger than the designated number Nd, and color patches as many as the designated number Nd are output according to the priority order from printable color patches. As a result, high-precision color estimation can be done using an arbitrary number of color patches that the user wants.

Modification of Embodiment

In the example of the above description, a plurality of printer models are prepared in advance to execute color estimation. However, the present invention is not limited to this. For example, color estimation may be executed using a single printer model. Alternatively, a plurality of printer models may be prepared, and color patches may be output based on the aforementioned method for each printer model. Then, the number of color patches can be reduced compared to a case in which color patches are generated based on a single printer model. Also, when grid points are commonly used by respective printer models, since color patches that can be shared by a plurality of printer models can be generated, the number of color patches can be further reduced.

In the example of the above description, the color estimation and measurement of color patches are attained using spectral reflectance data. However, the present invention is not limited to this. For example, the color estimation may be executed using an XYZ colorimetric system. In this case, since the number of dimensions is three (X, Y, and Z), quicker color estimation can be expected by reducing the operation amount and data amount compared to spectral reflectance data for 31 dimensions of 400 nm to 700 nm in 10-nm steps described in the above embodiment.

In the example of the above description, a generation apparatus for generating a color separation table is explained. However, the present invention is not limited to this. For example, the present invention can apply to a generation apparatus which generates a color matching table for converting RGB data to RGB data. In this case, correspondence between RGB values inputted to an output device and colors outputted from the output device must be held as the color matching table when the RGB values are respectively sampled in 32 steps so as to indicate a characteristic of the output device. When the color matching table is generated by measuring colorimetric values corresponding to all lattice points, $32^3$ (=32,768) points of measurement are necessary, thus the measurement number of times becomes enormous. If the method described in the above embodiment is applied to generation of the color matching table, it can generate the color matching table having accuracy which is the same as when the all lattice points are measured in the smaller measurement number of times. Note that an estimation method in the generation of the color matching table is not limited to the Cellular Yule-Nielsen Neugebauer model, a various method such as a liner interpolation, tetrahedron interpolation or the like can be used.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A color processing apparatus for determining color patches corresponding to an output device, the apparatus comprising:
    an input section configured to input colorimetric values of a plurality of color patches of at least one primary color of the output device;
    an estimator configured to estimate, based on the inputted colorimetric values of first color patches corresponding to a part of the plurality of color patches, colorimetric values corresponding to second color patches other than the first color patches among the plurality of color patches;
    a calculator configured to calculate errors between the colorimetric values of the second color patches input by the input section and the colorimetric values corresponding to the second color patches estimated by the estimator; and
    a determiner configured to determine a plurality of color patches corresponding to the output device by adding the second color patches based on the errors calculated by the calculator.

2. The apparatus according to claim 1, further comprising a preparation section configured to prepare a color separation table for the output device based on colorimetric values of the color patches.

3. A method of controlling a color processing apparatus, comprising:
    using a processor to perform the steps of:
    inputting colorimetric values of a plurality of color patches of at least one primary color of an output device;
    estimating, based on the inputted colorimetric values of first color patches corresponding to a part of the plurality of color patches, colorimetric values corresponding to second color patches other than the first color patches among the plurality of color patches;
    calculating errors between the colorimetric values of the second color patches input in the inputting step, and the colorimetric values corresponding to the second color patches estimated in the estimating step; and
    determining a plurality of color patches corresponding to the output device by adding the second color patches based on the errors calculated in the calculating step.

4. The method according to claim 3, further comprising preparing a color separation table for the output device based on colorimetric values of the color patches.

* * * * *